Sept. 1, 1970     E. KULL ET AL     3,526,313

FOOD CONTAINER AND SERVING ACCESSORIES

Filed Nov. 26, 1968     2 Sheets-Sheet 2

INVENTORS
EBERHARD KULL
BERNHARD WETZKE
WALTER GRIEBEL
KARL-HEINZ BREITE
HEINRICH WIESMAIR

BY *Nolte & Nolte*

ATTORNEYS

United States Patent Office 3,526,313
Patented Sept. 1, 1970

3,526,313
FOOD CONTAINER AND SERVING ACCESSORIES
Eberhard Kull, Halle, Bernhard Wetzke, Ilmenau, and Walter Griebel, Karl-Heinz Breite, and Heinrich Wiesmair, Dermbach, Germany, assignors to VEB Rhonglaswerk Dermbach, Dermbach, Germany
Filed Nov. 26, 1968, Ser. No. 778,958
Int. Cl. A45c 11/20
U.S. Cl. 206—4
9 Claims

ABSTRACT OF THE DISCLOSURE

A container for food has an opening with a stopper, an elongated handle, having two sidewalls forming an elongated space therebetween, is disposed on one side of the container, a drinking cup, having a handle with a flat end, is designed to cover the opening with the stopper located therein while the flat end of the cup handle covers the upper open end of the elongated space, a separate milk container is slidably movable into said elongated space, said milk container being designed to occupy only part of the elongated space leaving additional space for storage of sugar or the like, an eating utensil like a spoon is slidably movable between the two sidewalls, said milk container, said stored sugar and said eating utensil are restrained from moving out of their position in the elongated space of the elongated handle when the flat end of the cup handle covers the upper end of the elongated space.

BACKGROUND OF THE INVENTION

Field of the invention

The present invention relates to containers for food, specifically to insulated containers designed to keep food and beverages hot or cold. Such containers are very widely used not only by tourists and campers, but also by restaurants, coffee shops and vendors of food in general.

Description of the prior art

Known are containers and insulated containers for food especially for beverages which have an opening with a stopper and a cup, with or without handle, to cover the opening with the stopper located therein.

The known combination of a container with a drinking cup does not permit any variation of the food or beverage contained therein, to take care of individual requirements of the respective user.

For instance, hot coffee supplied from such a container is usually already mixed with milk and sugar and the individual user cannot adjust or mix the beverage to his own taste.

Individual mixing of beverages is possible only if the various components of the beverage like milk and coffee are kept separately in individual, separate containers. This presents usually various difficulties and is impractical for tourists and campers and creates problems for restaurants, coffee shops and the like where the storage and display of food must be confined to the smallest possible space.

SUMMARY OF THE INVENTION

It is an object of the present invention to provide a new and improved combination of a container with serving accessories which would overcome the disadvantages of the presently known containers and which would permit the serving of beverages like hot coffee mixed to the individual requirements of the consumer.

It is a further object of the invention to provide a combination of an insulated container with serving accessories, wherein the main beverage, for instance, coffee, is kept in the insulated main container whereas additional ingredients like milk and sugar are kept separately but in the same unit ready to be added to the main beverage, when required, in quantities corresponding to individual requirements.

It is a specific object of the invention to provide an insulated container for liquid food having an elongated handle designed to receive in a separate space a container for another liquid like milk or cream and a supply of a solid ingredient like sugar, said space being closed on one of its elongated sides by an eating utensil whereas the top of the space is closed by the handle of a drinking cup, when said cup covers the opening of the container, thereby holding simultaneously the eating utensil in position in said handle space.

Such a container combination not only permits to adjust the food, just shortly before consumption, to the taste and requirement of the consumer but the combination is extremely compact so that in spite of all advantages offered thereby the combination hardly requires more space than a conventional insulated container of the same capacity.

The combination can be moved with safety and is therefore specifically useful for campers and tourists.

The removal of the components located in the handle of the container is extremely simple and of course the container and all the components of the combination can be used for cold or hot and for liquid and solid food.

Th compactness and space saving property of the container combination offer obvious advantages for use in restaurants, coffee shops and the like where only a limited storage space is available.

BRIEF DESCRIPTION OF THE DRAWING

In order that the present invention may be readily carried into effect, it will now be described with reference to the accompanying drawing wherein.

DESCRIPTION OF THE PREFERRED EMBODIMENT

Figure 1:
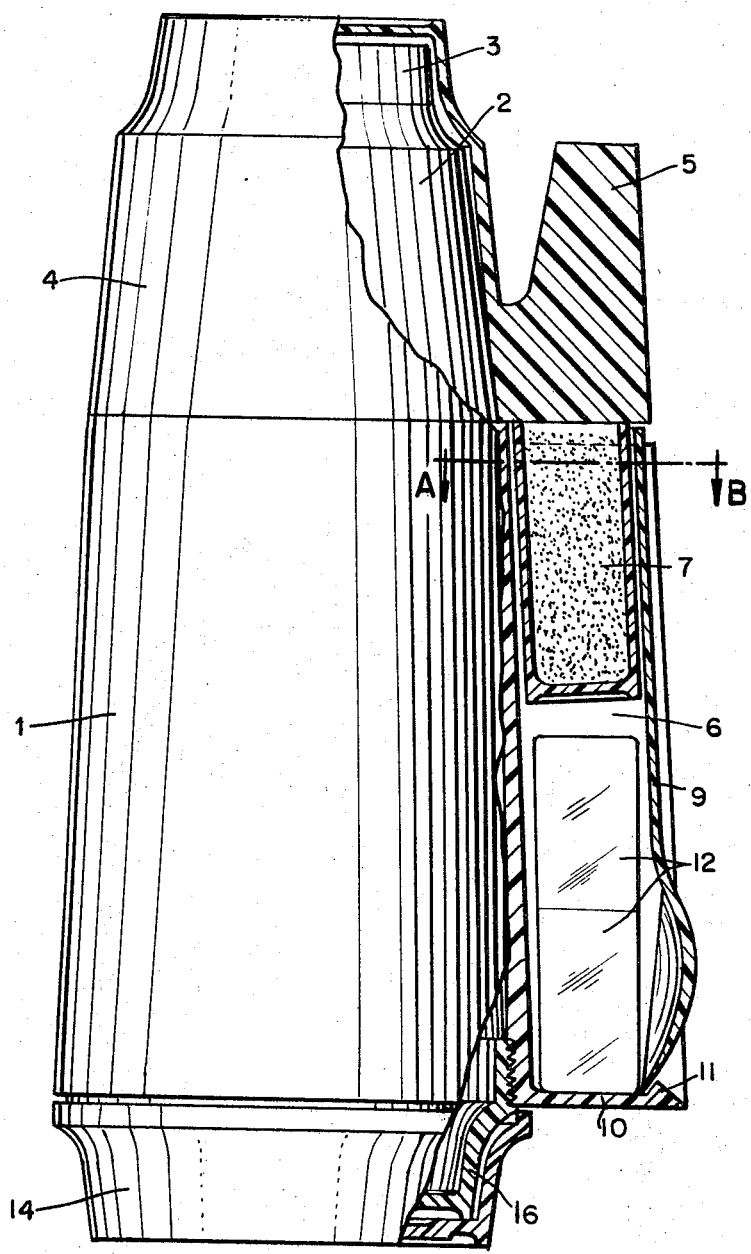
FIG. 1 is a side elevational view, partly in section, showing a container with a drinking cup in closed position, and the additional container, the solid ingredient and the eating utensil arranged in the elongated handle.

In FIG. 1 is shown a container 1 having an upper portion 2 with an opening closed by a stopper 3. A drinking cup 4 is tightly fitted over the upper portion 2 covering the opening of the main container and the stopper 3 disposed therein.

An elongated container handle formed by a pair of elongated sidewalls 6 is disposed on one side of the container, said sidewalls together with a portion of the container and a bridge 10 defining within the handle an elongated space, open on top and on one side thereof.

Figure 2:
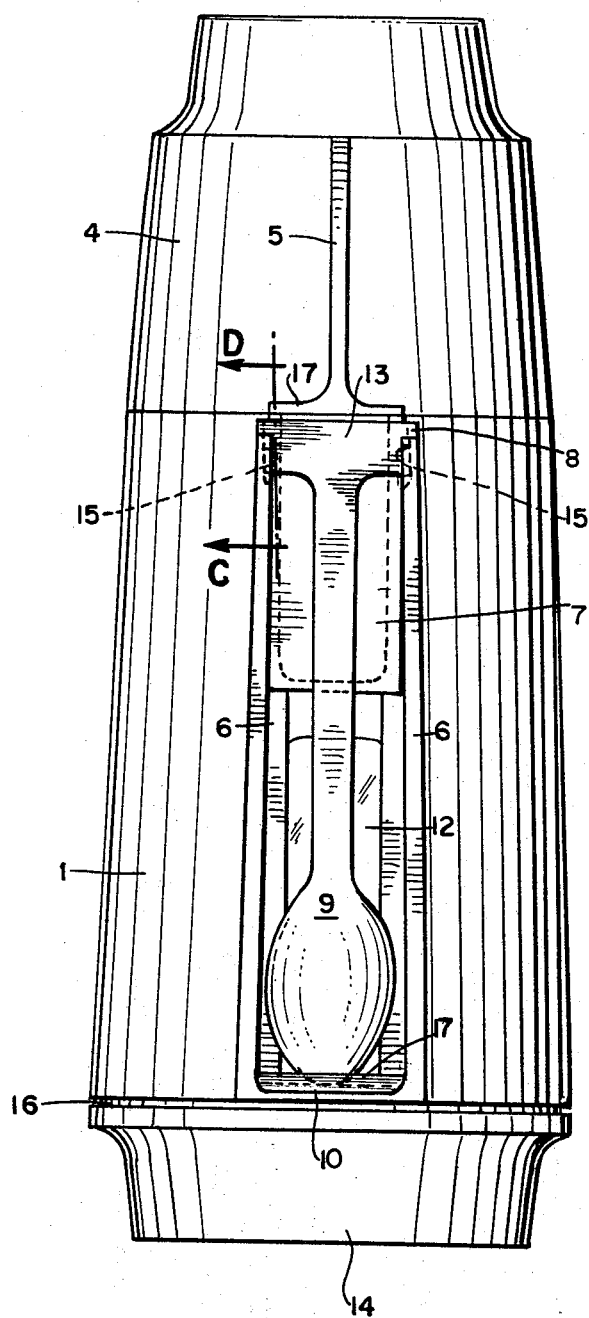
FIG. 2 is a front view of the same container with the elongated handle facing the viewer.
Figure 3:
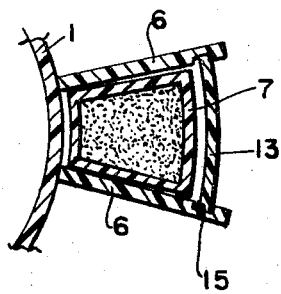
FIG. 3 is a sectional view taken along line A–B of FIG. 1.
Figure 4:
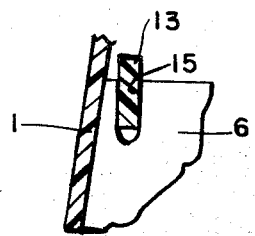
FIG. 4 is a view taken along line C–D of FIG. 2 with the inserts removed from the space in the elongated handle of the container.

A separate small container 7, open on one end and having two lateral rim extensions 8 near the open end (FIG. 2), is slidably movable into and out of the elongated space, and is designed to be stored in the upper portion thereof. The two lateral rim extensions 8 restrict the small container 7 to the upper portion of the elongated space, inasmuch as the extensions 8 are adapted to rest on the top ends of sidewalls 6, whereby the lower portion remains free to be used as storage space for solid ingredients 12.

An eating utensil 9 having an elongated handle is provided at the end of its handle with an extension 13, which is designed to fit into two slots 15 in the sidewalls 6. A catch 11 is provided near the outside edge of the bridge 10 to hold the eating utensil 9 in position when the handle extension 13 is located in the two slots 15. The eating utensil thus serves in the position at least as partial cover for the open side of the elongated handle of the container.

The drinking cup 4 has a handle 5 with a flat top 17 near the rim of the cup, the flat top is designed to cover the top opening in the elongated handle of the container thus restraining movement of the small container, and of the eating utensil and thereby also restraining movement of the solid ingredient located in the elongated space.

Thus it is possible to have one compact unit consisting of a main container holding one beverage, a small container holding another beverage, a serving cup, an eat-utensil and an additional solid ingredient.

The main container might consist of 2 parts in which case the lower part 16 is removable for easier access to the inside of the container.

For use in restaurants, coffee shops and the like, a separate plate 14 may be provided for depositing the container combination thereon.

The use of the container with the serving accessories is of course not limited for use in connection with coffee or tea and milk and sugar. The combination is well suited for other uses like soft drinks where the main container could hold the basic liquid whereas the small container could hold a concentrate and the solid ingredient could be an artificial sweetener.

What is claimed is:

1. A food container with serving accessories comprising a main food container having an opening, a stopper designed to close said opening, elongated handle meas disposed on one side of said container, said handle means having wall means defining an elongated space, a small container slidably movable in and out of said space, an eating utensil also movable in and out of said space, a drinking cup having a handle disposed on one side thereof, said handle being designed to restrain the movement of said small container and said eating utensil out of said space when said drinking cup covers the opening of the main container.

2. A food container with serving accessories as set forth in claim 1 also comprising insulation means forming the walls of the main container for retarding the change of temperature of the food stored therein.

3. A food container with serving accessories as set forth in claim 1 wherein said main food container is constituted of two separate parts, one of said parts being removable from the other of said parts for readily obtaining access to the inside of said container.

4. A food container with serving accessories as set forth in claim 1, wherein said elongated space has an upper and a lower portion, and also comprising restraining means for the small container to permit slidable movement thereof into the upper portion only, said lower portion serving as storage space for solid ingredients.

5. A food container with serving accessories as set forth in claim 4, wherein said handle means consist of two elongated wallpieces attached to the main food container and being remote from each other and a bridge piece extending on one end of said handle means between said wallpieces and transversely thereto, said elongated space, defined by said wallpieces and said bridge piece, having openings on the outer side of the handle means and on top thereof, said eating utensil when moved into said space forms at least a partial cover for the opening on the outer side of said handle means and restrains the movement of the small container when said drinking cup covers the opening of said main container, said handle of said drinking cup covering the opening on top of said handle means.

6. A food container with serving accessories as set forth in claim 5, wherein said eating utensil has a handle with a lateral extension on the end thereof, said sidewalls having slots designed to receive said lateral extension, and also comprising a catch disposed on said bridge piece, said catch holding said eating utensil in position when said extension is moved into said slots and when the handle of said drinking cup covers the opening on top of said handle means.

7. A food container with serving accessories as set forth in claim 5 wherein said handle of said drinking cup has a lateral extension near the rim of the cup, said extension providing a cover for said small container and for said opening on top of said handle means when said cup covers said opening of the main container.

8. A combination food container and serving accessories comprising a main food container having an opening at one end, a stopper for removably closing said opening, an elongated handle located on the side of said container and constituting spaced wall means defining a space therebetween, a relatively small container removably held in said space, an eating utensil also removably held within said space, a drinking cup, said drinking cup being provided with a handle which is positioned adjacent to said spaced wall means whereby the movement of said small container and said eating utensil out of said space is prevented when said drinking cup is inverted and covers said opening in the main container.

9. A combination food container and serving accessories comprising a main food container having an opening at one end, a stopper for removably closing said opening, an elongated handle located on the side of said container and constituting spaced wall means defining a space therebetween, said spaced walls being provided with space-confronting grooves, a relatively small container removably held in said space, an eating utensil slidable in said grooves and removably held in said space, and a removable drinking cup covering the opening in said main container.

References Cited

UNITED STATES PATENTS

| 2,274,973 | 3/1942 | Bryant | 215—6 XR |
| 2,744,649 | 5/1956 | Smith | 215—100 |
| D. 200,978 | 4/1965 | Seltz. | |

JOSEPH R. LECLAIR, Primary Examiner

J. M. CASKIE, Assistant Examiner

U.S. Cl. X.R.

215—6. 100